(12) United States Patent
Liu

(10) Patent No.: US 8,687,249 B1
(45) Date of Patent: Apr. 1, 2014

(54) PORTABLE SCANNER

(75) Inventor: Chin-Te Liu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 35 days.

(21) Appl. No.: 13/609,381

(22) Filed: Sep. 11, 2012

(51) Int. Cl.
| | |
|---|---|
| H04N 1/04 | (2006.01) |
| H04N 1/00 | (2006.01) |
| H04N 1/40 | (2006.01) |
| H04N 1/024 | (2006.01) |
| H01J 3/14 | (2006.01) |
| B65H 5/22 | (2006.01) |
| G06K 9/22 | (2006.01) |

(52) U.S. Cl.
USPC ........... 358/498; 358/400; 358/444; 358/471; 358/473; 358/494; 250/234; 271/3.14; 382/313

(58) Field of Classification Search
USPC ................. 358/400, 444, 498, 471, 473, 494; 250/234; 271/3.14; 382/313
See application file for complete search history.

(56) References Cited

U.S. PATENT DOCUMENTS

| | | | | |
|---|---|---|---|---|
| 4,743,974 A | * | 5/1988 | Lockwood | 358/494 |
| 5,602,650 A | * | 2/1997 | Tamura et al. | 358/400 |
| 5,644,663 A | * | 7/1997 | Saito et al. | 382/313 |
| 5,854,694 A | * | 12/1998 | Payne et al. | 358/473 |
| 5,865,431 A | * | 2/1999 | Ma | 271/3.14 |
| 5,981,943 A | * | 11/1999 | Berg et al. | 250/234 |
| 6,509,981 B1 | * | 1/2003 | Shih | 358/474 |
| 6,791,720 B1 | * | 9/2004 | Hsieh | 358/473 |
| 2010/0321741 A1 | * | 12/2010 | van Os | 358/471 |
| 2010/0321745 A1 | * | 12/2010 | Van Os | 358/498 |
| 2012/0307316 A1 | * | 12/2012 | De Muelenaere et al. | 358/444 |

* cited by examiner

*Primary Examiner* — Charlotte M. Baker
*Assistant Examiner* — Rury Grisham

(57) ABSTRACT

A portable scanner includes a housing including a hollow upper housing and a hollow lower housing of which two ends are connected together to define a transmitting passage therebetween, a switching device rotatably mounted inside the upper housing, a first scanning device mounted on the switching device, and a document feeder for transmitting the document automatically through the transmitting passage. A first and a second scanning window are opened in and penetrating through two different sides of the upper housing respectively, wherein the second scanning window is communicated with the transmitting passage. The switching device together with the first scanning device are switched between a first scanning state that is the first scanning device faces the first scanning window for scanning the document manually, and a second scanning state that is the first scanning device faces the second scanning window for scanning the document automatically.

6 Claims, 9 Drawing Sheets though the second scanning window and be scanned by the first scanning device. So, the portable scanner can scan documents in almost any size or any shape, and further can provide a high quality image of the document. Furthermore, the portable scanner has a smaller size than the flatbed scanner in prior art.

PORTABLE SCANNER

BACKGROUND OF THE INVENTION

1. Field of the Invention

The present invention generally relates to a scanner, and more particularly to a portable scanner.

2. The Related Art

In order to use, storage and publish documents more efficiently and conveniently, ordinary documents written or printed on paper would be converted to digital data by virtue of optical scanners for the convenience of follow-up application. Referring to FIG. 1, one of the conventional optical scanners is a flatbed scanner 90. The flatbed scanner 90 includes a scanning plate 91 for bearing documents and a movable scanning device 92 movably mounted over the scanning plate 91. In use, the document is put on the scanning plate 91, then the movable scanning device 92 is driven to move along the document and scan the document. The flatbed scanner 90 can provide the high quality image, because the document is held still on the scanning plate 91 and the movable scanning device 92 can scan the document smoothly. However, the flatbed scanner 90 has too big size to be portable. Therefore, portable scanners came with the tide of fashion.

Referring to FIG. 2 and FIG. 3, the conventional portable scanners are generally sorted into two kinds of which one is designated as an auto-feed scanner 80 shown in FIG. 2 and the other is designated as a hand-held scanner 70 shown in FIG. 3. Referring to FIG. 2, the auto-feed scanner 80 can scan the document smoothly and automatically like the flatbed scanner 90. In order to make the auto-feed scanner 80 smaller, it includes an immovable scanning device (not shown) fastened in the auto-feed scanner 80 and a document feeder 81 for automatically transmitting documents through the immovable scanning device. Therefore, the auto-feed scanner 80 is easier to be carried and also able to provide the high quality image. However, the auto-feed scanner 80 fails to scan the document which is larger than the scanner in size.

Referring to FIG. 3, in order to make the hand-held scanner 70 smaller, an immovable scanning device (not shown) is fixed in the hand-held scanner 70. But the hand-held scanner 70 has no function of automatically transmitting the documents through the immovable scanning device. As a result, in use, the user has to manually swipe the hand-held scanner 70 through the document. So, the hand-held scanner 70 can scan documents in almost any size or any shape. However, the image quality provided by the hand-held scanner 70 is not as good as the auto-feed scanner 80 or the flatbed scanner 90. Because the foregoing scanning process is achieved by the manual operation, it is difficult to swipe the hand-held scanner 70 at a constant speed, besides, the hand-held scanner 70 is apt to diverge from the predetermined scanning path or be shaken in the process of being swiped. As a result, a twisted or deform image is often provided by the hand-held scanner 70.

In view of these disadvantages above, the conventional portable scanner needs to be improved.

SUMMARY OF THE INVENTION

An objective of the present invention is to provide a portable scanner which is selectable to scan documents in auto-feed or hand-held as needed, and reduces the producing cost.

To reach such purpose, a portable scanner adapted for scanning a document manually and automatically, comprises a housing, a switching device, a first scanning device and a document feeder.

The housing includes a hollow upper housing and a hollow lower housing of which two ends are connected together to define a transmitting passage therebetween. A first scanning window and a second scanning window are opened in and penetrating through two different sides of the upper housing respectively, wherein the second scanning window is opened in a bottom side of the upper housing and communicated with the transmitting passage.

The switching device is rotatably mounted inside the upper housing, and the first scanning device is mounted on the switching device. The switching device together with the first scanning device are switched between a first scanning state that is the first scanning device faces the first scanning window, and a second scanning state that is the first scanning device faces the second scanning window.

The document feeder includes a feeding roller unit and a drawing-out roller unit arranged at upstream and downstream sides of the second scanning window according to the direction of transmitting the document in the transmitting passage. Both the feeding roller unit and the drawing-out roller unit are disposed in the upper housing and the lower housing and project in the transmitting passage for transmitting the document through the second scanning window along the transmitting passage.

As described above, in use, when the switching device is at the first scanning state, the document is scanned by the first scanning device by virtue of hand-holding the portable scanner to make the first scanning window move through the document. When the switching device is at the second scanning state, the document is automatically transmitted by the document feeder along the transmitting passage to pass through the second scanning window and be scanned by the first scanning device. So, the portable scanner can scan documents in almost any size or any shape, and further can provide a high quality image of the document. Furthermore, the portable scanner has a smaller size than the flatbed scanner in prior art.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 4:
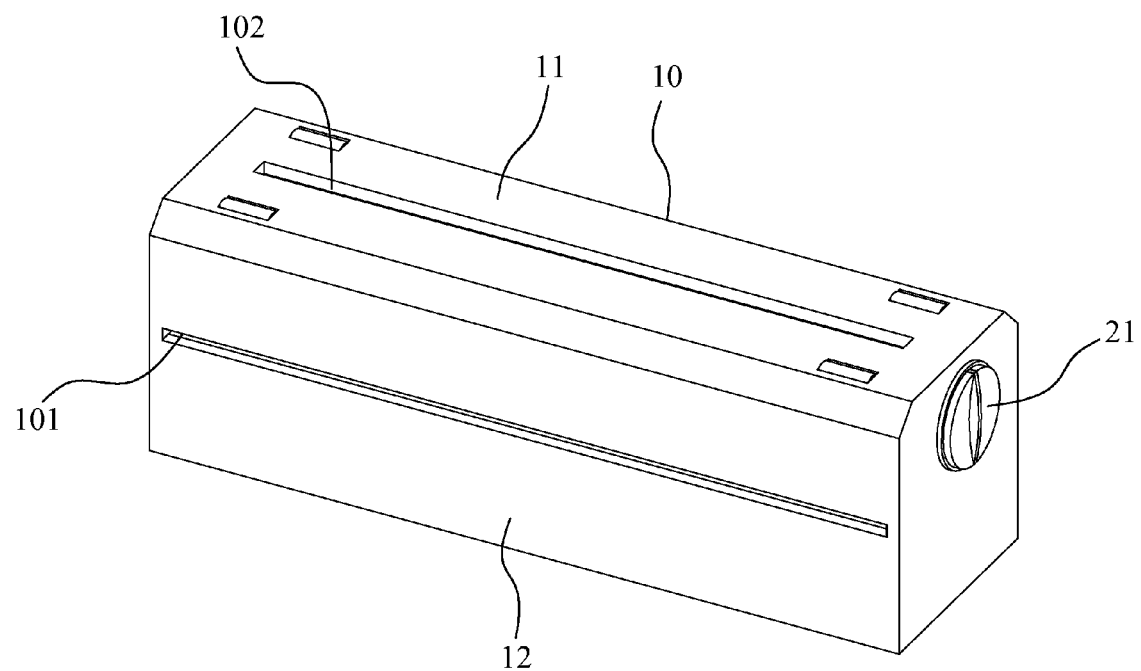
FIG. 4 shows a perspective view of a portable scanner in accordance with an embodiment of the present invention.
Figure 5:
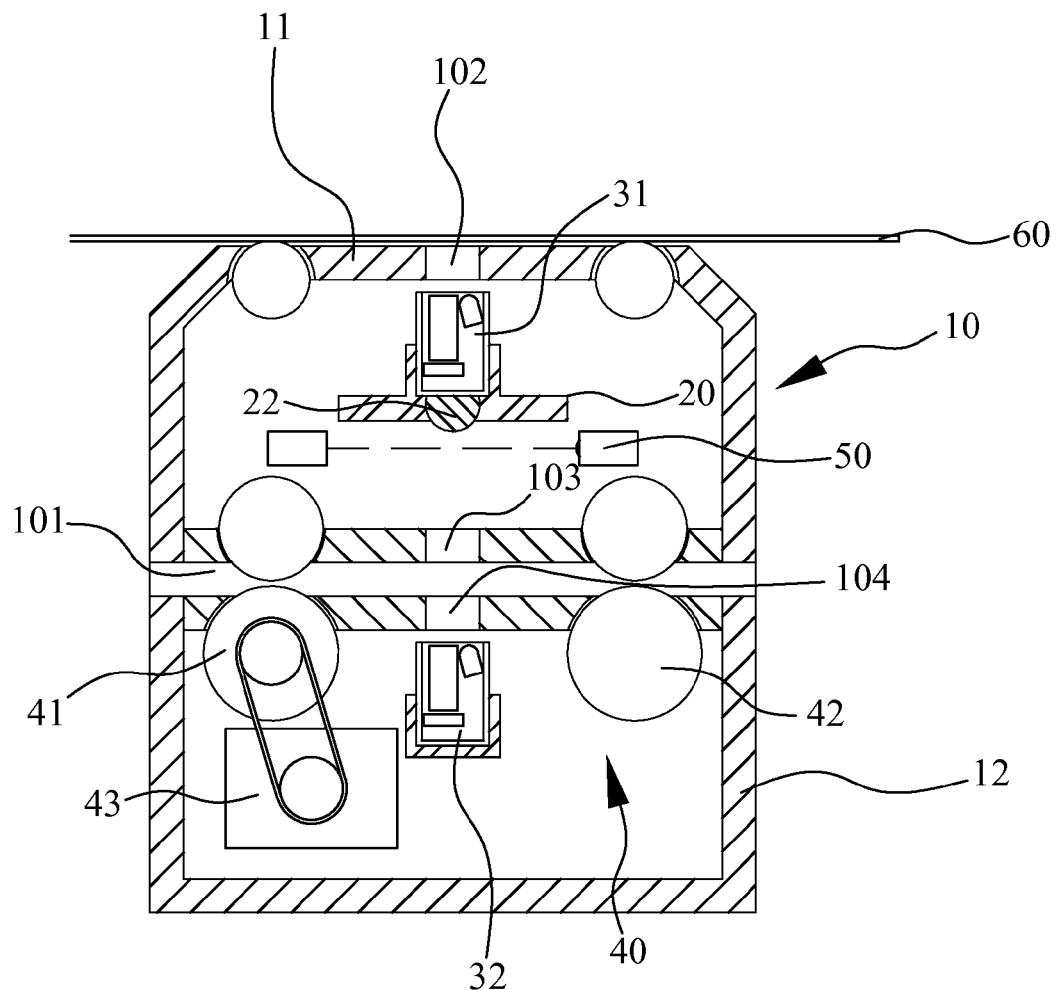
FIG. 5 shows a cross-sectional view of the portable scanner of FIG. 4, wherein the portable scanner is at a first scanning state for scanning a document manually.
Figure 6:
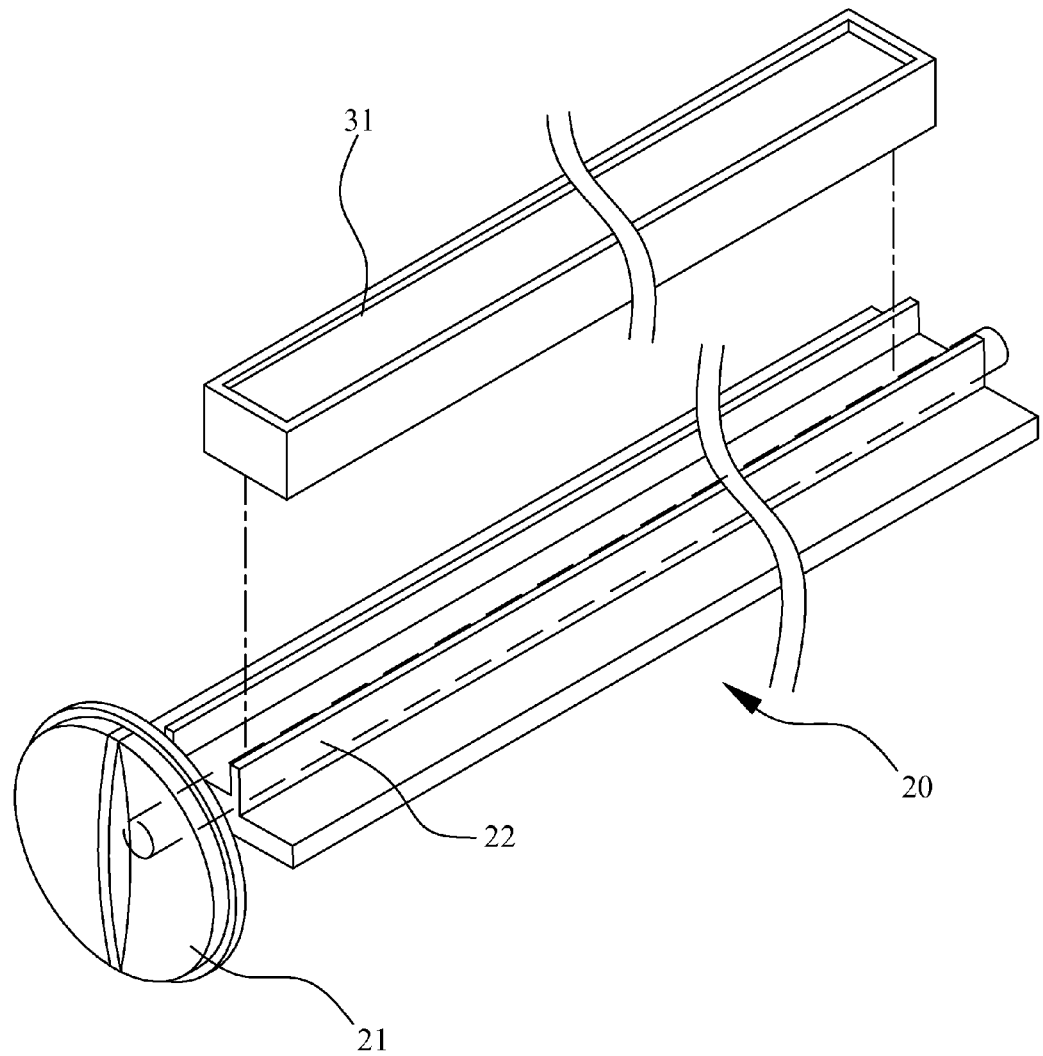
FIG. 6 shows an exploded perspective view of a switching device and a first scanning device of the portable scanner of FIG. 5.
Figure 7:
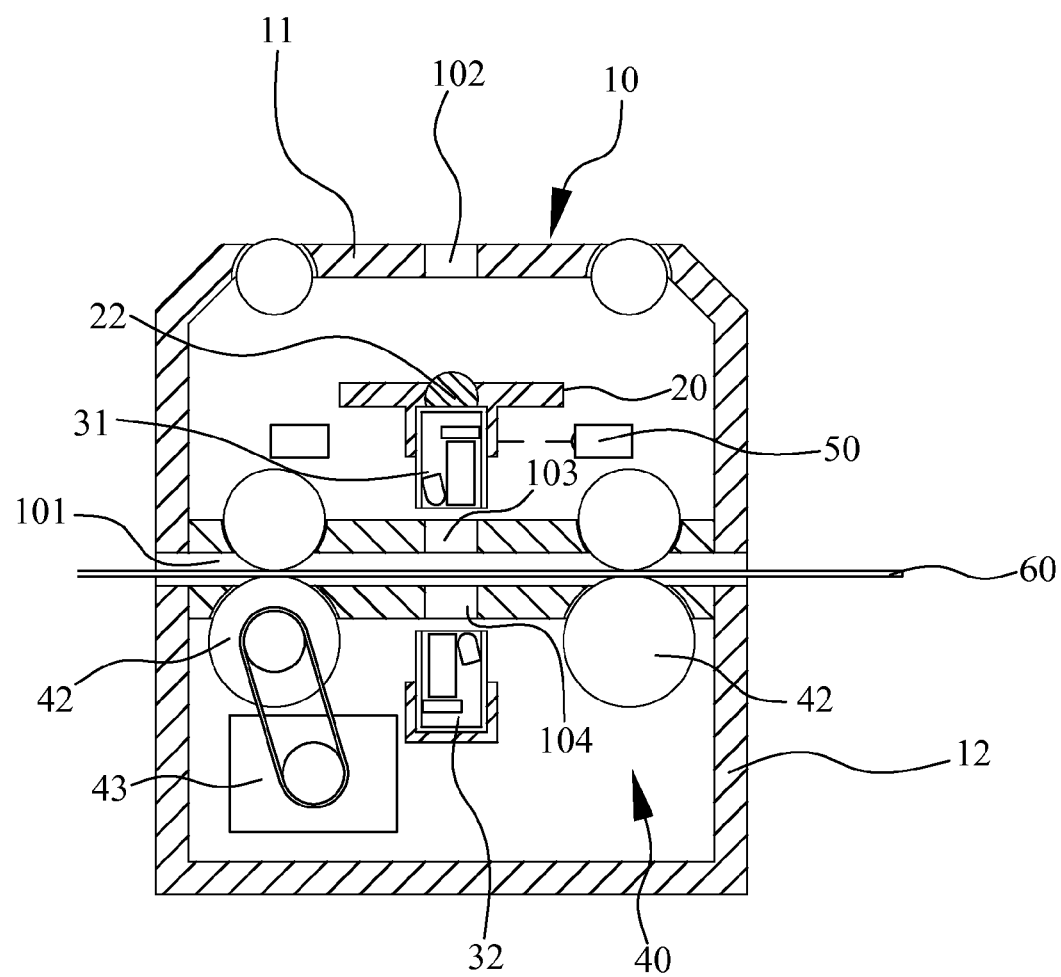
FIG. 7 shows a cross-sectional view of the portable scanner of FIG. 4, wherein the portable scanner is at a second scanning state for scanning a document automatically.

Referring to FIG. 4, FIG. 5 and FIG. 7, a portable scanner 100 according to an embodiment of this invention is described below. The portable scanner 100 includes a housing 10 which includes a hollow upper housing 11 and a hollow lower housing 12, a switching device 20 mounted inside the upper housing 11, a first scanning device 31 mounted on the switching device 20 and a document feeder 40.

Two ends of the upper housing 11 and the lower housing 12 are connected together to define a transmitting passage 101 therebetween. A first scanning window 102 and a second scanning window 103 are opened in and penetrating through two different sides of the upper housing 11 respectively. In this embodiment, the second scanning window 103 is opened in a bottom side of the upper housing 11 to communicate with the transmitting passage 101, and the first scanning window 102 is opened in a top side of the upper housing 11 opposite to the second scanning window 103.

The switching device 20 is rotatably mounted inside the upper housing 11, so the switching device 20 together with the first scanning device 31 are switched between a first scanning state that is the first scanning device 31 faces the first scanning window 102 and a second scanning state that is the first scanning device 31 faces the second scanning window 103.

With reference to FIGS. 4-7, in this embodiment, the switching device 20 includes a rotary shaft 22 pivoted to the two ends of the upper housing 11 and parallel to the scanning windows 102, 103 with the first scanning device 31 being fixed thereto, and a knob 21 connected to one end of the rotary shaft 22 and exposed outside the upper housing 11 for switching the scanning states of the first scanning device 31 via manually turning the knob 21 together with the rotary shaft 22.

Referring to FIG. 5 and FIG. 7, the document feeder 40 includes a feeding roller unit 41, a drawing-out roller unit 42 and a driving motor 43.

The feeding roller unit 41 and the drawing-out roller unit 42 are arranged at upstream and downstream sides of the second scanning window 103 of the housing 10 according to the direction of transmitting a document 60 in the transmitting passage 101. The driving motor 43 is mounted inside the lower housing 12 for driving the feeding roller unit 41. Both the feeding roller unit 41 and the drawing-out roller unit 42 are disposed in the upper housing 11 and the lower housing 12 and project in the transmitting passage 101 for transmitting the document 60 through the second scanning window 103 along the transmitting passage 101.

Furthermore, the portable scanner 100 comprises a position sensor 50 which is mounted inside the upper housing 11 for detecting the position of the first scanning device 31 so as to make the portable scanner 100 choose an appropriate working procedure for corresponding to the manual or automatic scan. The position sensor 50 in this embodiment is a proximity sensor which detects the distance between the targeted object and the sensor itself. Therefore, the position sensor 50 detects the position of the first scanning device 31 based on the first scanning device 31 along with the switching device 20 is rotated close to or away from the position sensor 50.

Figure 8:
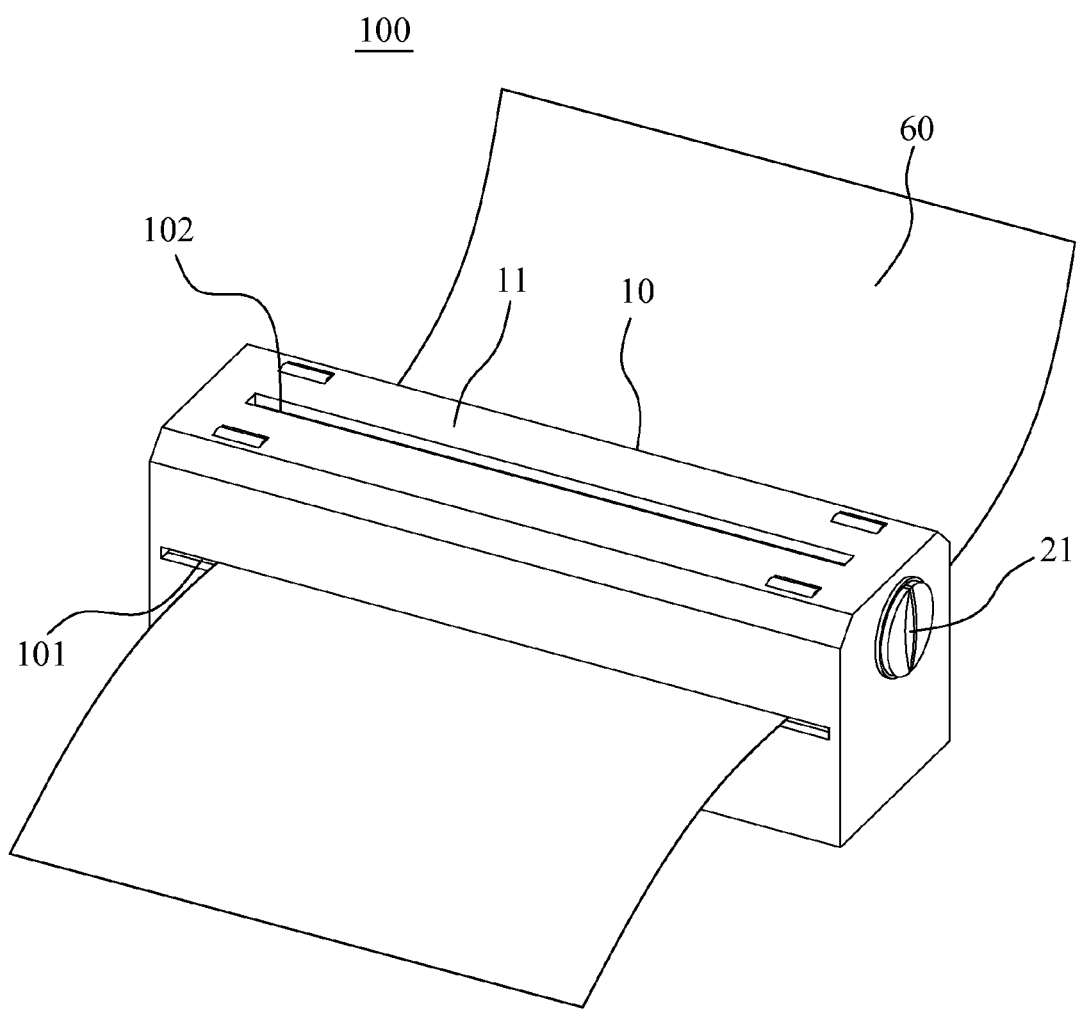
FIG. 8 shows the scanning process of the portable scanner in the auto-feed scanning mode.
Figure 9:
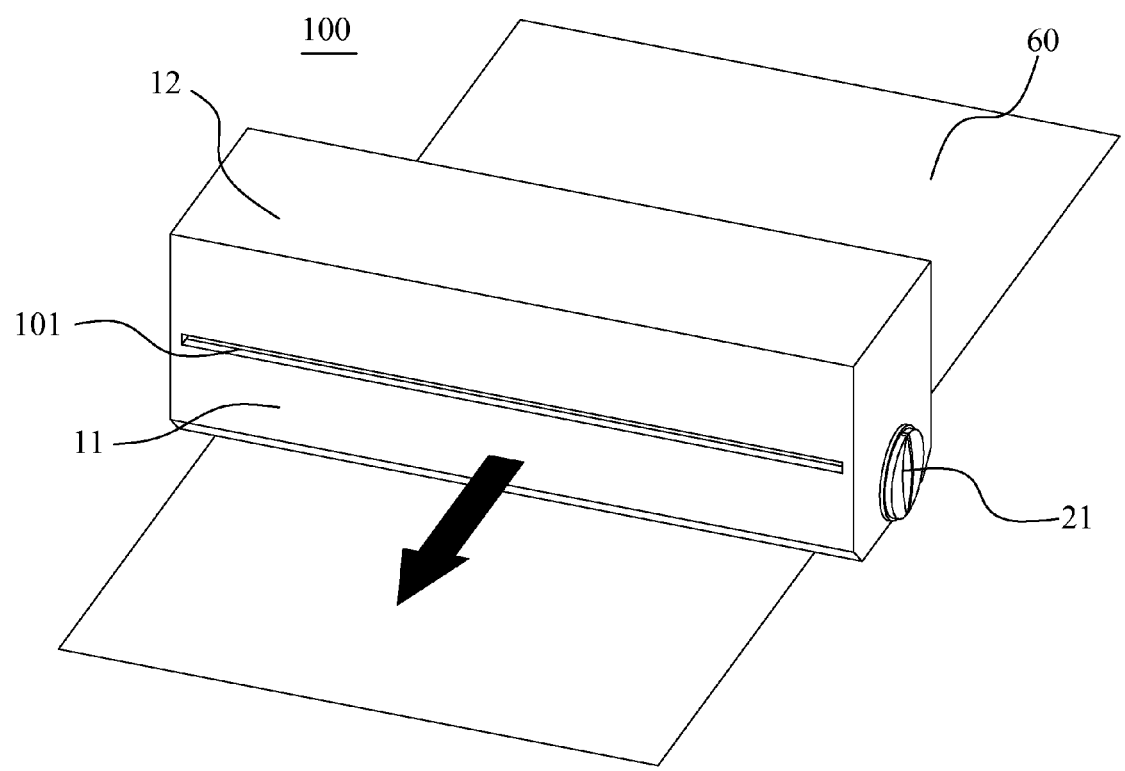
FIG. 9 shows the scanning process of the portable scanner in the hand-held scanning mode.

As a resolute, when the switching device 20 is at the first scanning state, the switching device 20 together with the first scanning device 31 will face the first scanning window 102, and the portable scanner 100 chooses the manual scanning procedure. The document 60 is going to be scanned by the first scanning device 31 by virtue of hand-holding the portable scanner 100 to make the first scanning window 102 move through the document 60 at this time (as shown in FIG. 5 and FIG. 9). In opposite, when the switching device 20 is at the second scanning state, the switching device 20 together with the first scanning device 31 will face the second scanning window 103, and the portable scanner 100 chooses the automatic scanning procedure. The document 60 is automatically transmitted by the document feeder 40 along the transmitting passage 101 to pass through the second scanning window 103 and be scanned by the first scanning device 31 (as shown in FIG. 7 and FIG. 8).

In some other cases, the document 60 may be printed in both sides. In order to scan the both sides at the same time, the portable scanner 100 further comprises a second scanning device 32 and the housing 10 further defines a third scanning window 104. The third scanning window 104 is opened in and vertically penetrating through a top side of the lower housing 12 to communicate with the transmitting passage 101 and face the second scanning window 103. The second scanning device 32 is fixed inside the lower housing 12 and faces the third scanning window 104. When the switching device 20 is at the second scanning state, the second scanning device 32 and the first scanning device 31 will be cooperated to scan both sides of the document 60 transmitted by the document feeder 40 through the second scanning window 103 and the third scanning window 104.

Figure 1:
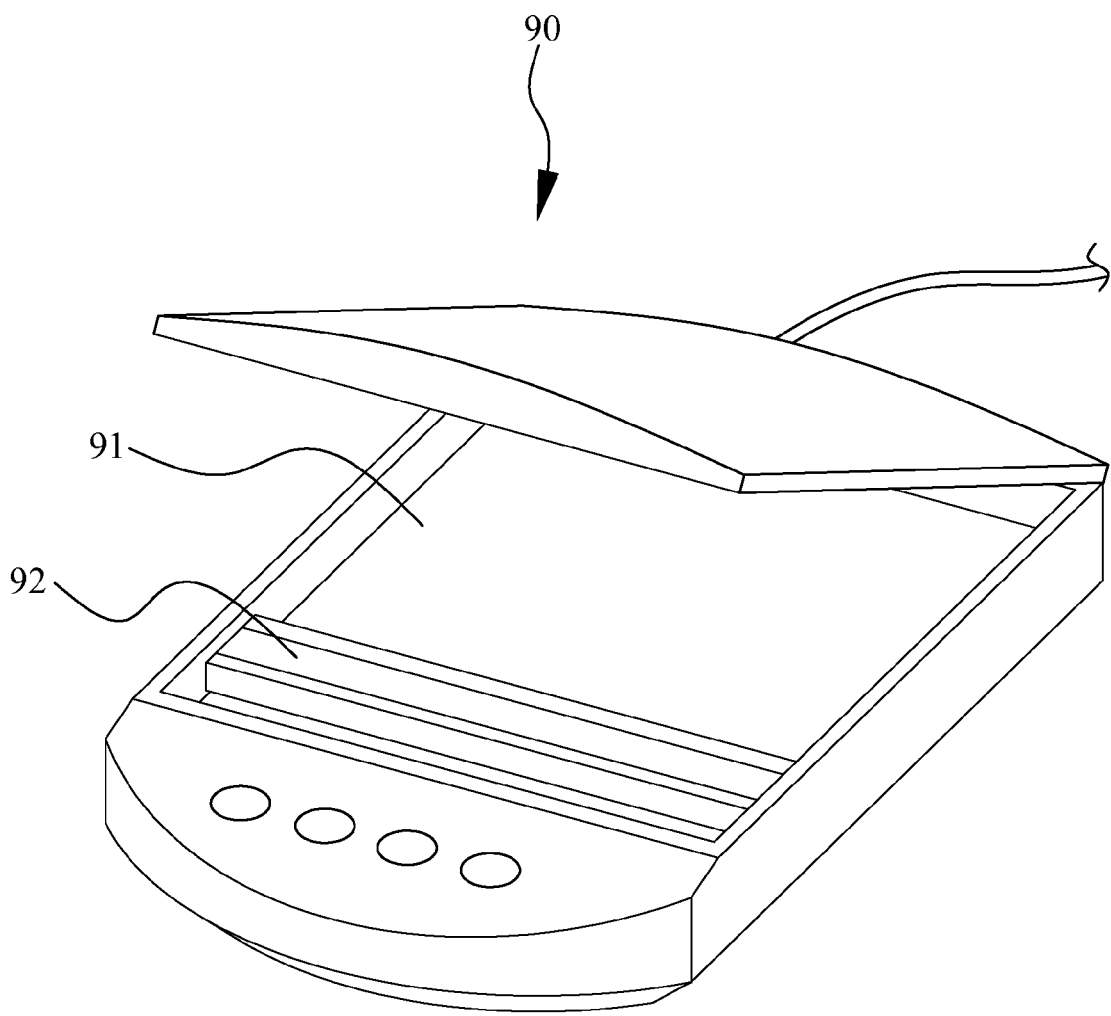
FIG. 1 shows a perspective view of a common flatbed scanner.
Figure 2:
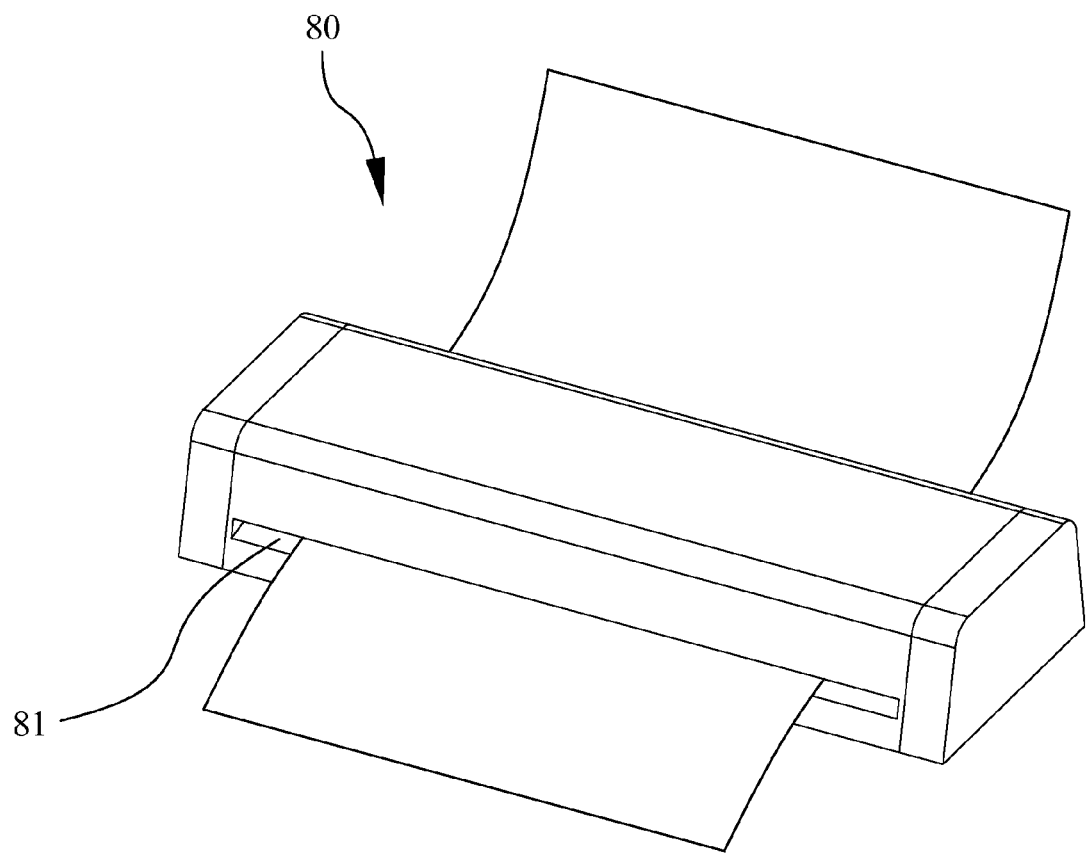
FIG. 2 shows a perspective view of a common auto-feed scanner.
Figure 3:
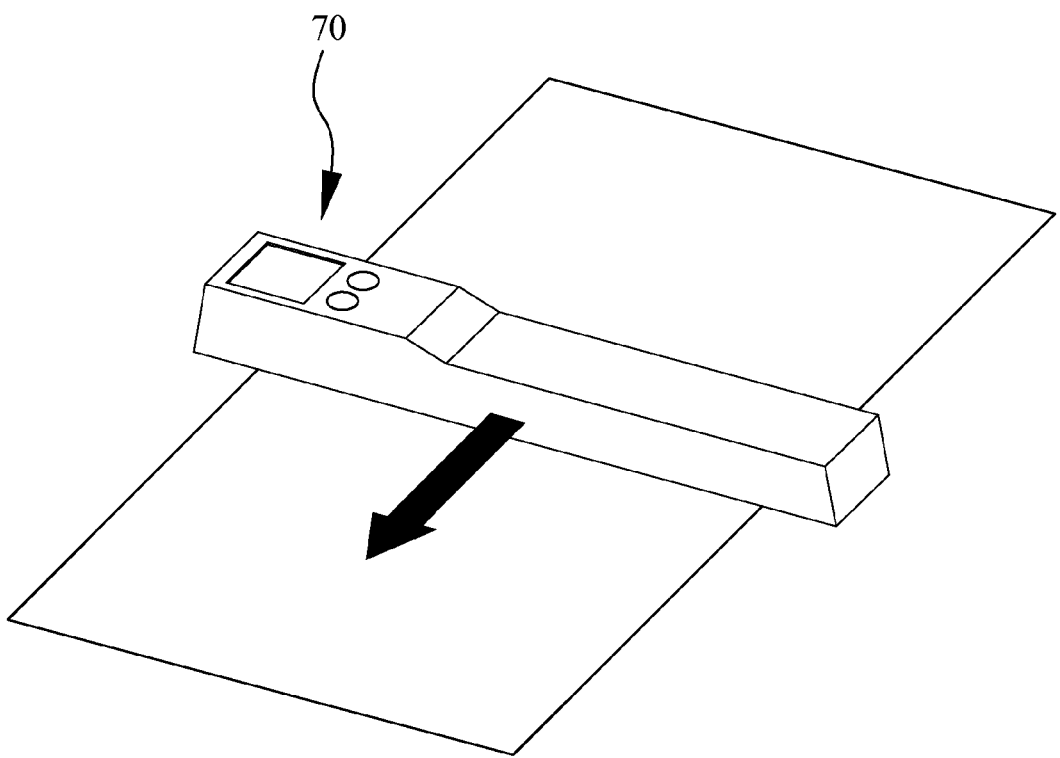
FIG. 3 shows a perspective view of a common hand-held scanner.

As described above, the portable scanner 100 utilizes the switching device 20 to switch the first scanning device 31 between the first scanning state for scanning the document 60 by virtue of hand-holding the portable scanner 100, and the second scanning state for scanning the document 60 by automatically transmitting the document 60 through the transmitting passage 101. So, the portable scanner 100 can scan documents in almost any size or any shape, and further can provide a high quality image of the document 60. Furthermore, the portable scanner 100 has a smaller size than the flatbed scanner 90 shown in FIG. 1.

The invention claimed is:

1. A portable scanner adapted for scanning a document manually and automatically, comprising: a housing including a hollow upper housing and a hollow lower housing of which two ends are connected together to define a transmitting passage therebetween, a first scanning window and a second scanning window being opened in and penetrating through two different sides of the upper housing respectively, wherein the second scanning window being opened in a bottom side of the upper housing and communicated with the transmitting passage;

a switching device rotatably mounted inside the upper housing; a first scanning device mounted on the switching device, the switching device together with the first scanning device being switched between a first scanning state that is the first scanning device faces the first scanning window, and a second scanning state that is the first scanning device faces the second scanning window; and a document feeder including a feeding roller unit and a drawing-out roller unit arranged at upstream and downstream sides of the second scanning window according to the direction of transmitting the document in the transmitting passage, both the feeding roller unit and the drawing-out roller unit being disposed in the upper housing and the lower housing and projecting in the transmitting passage for transmitting the document through the second scanning window along the transmitting passage, wherein when the switching device is at the first scanning state, the document is scanned by the first scanning device by virtue of hand-holding the portable scanner to make the first scanning window move through the document, when the switching device is at the second scanning state, the document is automatically transmitted by the document feeder along the transmitting passage to pass through the second scanning window and be scanned by the first scanning device.

2. The portable scanner as claimed in claim 1, wherein the switching device includes a rotary shaft pivoted to the two ends of the upper housing and parallel to the scanning windows with the first scanning device being fixed thereto, and a knob connected to one end of the rotary shaft for switching the scanning states of the first scanning device via manually turning the knob together with the rotary shaft.

3. The portable scanner as claimed in claim 1, further comprising a position sensor which is mounted inside the upper housing for detecting the position of the first scanning device so as to make the portable scanner choose an appropriate working procedure for corresponding to the manual or automatic scan, the position sensor detects the position of the first scanning device because the first scanning device along with the switching device is rotated close to or away from the position sensor.

4. The portable scanner as claimed in claim 1, wherein the document feeder further includes a driving motor mounted inside the lower housing for driving the feeding roller unit.

5. The portable scanner as claimed in claim 1, wherein a third scanning window is opened in and vertically penetrating through a top side of the lower housing to communicate with the transmitting passage and face the second scanning window, the portable scanner further includes a second scanning device fixed inside the lower housing and facing the third scanning window, when the switching device is at the second scanning state, the second scanning device and the first scanning device cooperate to scan both sides of the document transmitted by the document feeder through the second scanning window and the third scanning window.

6. The portable scanner as claimed in claim 1, wherein the first scanning window is opened in a top side of the upper housing opposite to the second scanning window.

* * * * *